United States Patent [19]

Yamamoto et al.

[11] 4,388,882
[45] Jun. 21, 1983

[54] AUTOMATIC SEWING MACHINE

[75] Inventors: Yoshikazu Yamamoto; Toshiaki Yanagi, both of Nagoya, Japan

[73] Assignee: Brother Kogyo Kabushiki Kaisha, Nagoya, Japan

[21] Appl. No.: 205,688

[22] Filed: Nov. 10, 1980

[30] Foreign Application Priority Data

Nov. 24, 1979 [JP] Japan ............................... 54-152185

[51] Int. Cl.³ ............................................ D05B 21/00
[52] U.S. Cl. ............................... 112/121.12; 112/220; 112/262.1
[58] Field of Search .................. 112/121.12, 121.11, 112/262.1, 220, 221, 266.1, 158 E, 275, 277, 102, 103

[56] References Cited

U.S. PATENT DOCUMENTS 4,164,192  8/1979  Herr et al. .................... 112/220 X
4,221,176  9/1980  Besore et al. ................ 112/121.12

Primary Examiner—Peter P. Nerbun
Attorney, Agent, or Firm—Browdy and Neimark

[57] ABSTRACT

An automatic sewing machine having an improved drive speed control system. Many stitch instructions each indicating the relative position between a vertically reciprocated needle and a workpiece are stored in a memory in a predetermined sequence. The large number of stitch instructions are divided into a plurality of groups consisting of a predetermined number of consecutive stitch instructions. For each group, a maximum permissible speed is determined in accordance with the variations of the relative position between the needle and the workpiece directed by the instructions of the group. This maximum permissible speed causes formation of an exact stitch pattern in the workpiece according to the stitch instructions in each of the groups. A speed control device controls the speed of the drive motor in accordance with the various maximum permissible speeds. This causes sewing to be performed in a highly effective and exact manner.

8 Claims, 5 Drawing Figures

AUTOMATIC SEWING MACHINE

BACKGROUND OF THE PRESENT INVENTION

This invention relates to an automatic sewing machine for carrying out sewing operations according to stitch instructions which are read out or extracted in a predetermined sequence from a memory and include stitch position data designating a relative position between a needle and a workpiece, and more particularly to the drive motor speed control of the machine in the sewing operation.

It has been conventional practice in this type of sewing machines that a permissible drive speed, i.e., the maximum permissible drive speed of the drive motor is determined according to the kind of sewing operation specified to an individual machine. In other words, a machine which is performs sewing operations including a fairly large relative positional movement between the needle and the workpiece is alloted from the outset a comparatively low maximum permissible speed corresponding to the large relative movement allowed. This maximum permissible speed naturally regulates many other sewing operations which the automatic sewing machine can perform. A specific speed control for the drive motor for the automatic sewing machine is designated or determined according to the above-mentioned predetermined maximum permissible speed allotted thereto.

In this sort of automatic sewing machines, even when a sewing operation can be carried with comparatively small relative positional movements, the drive motor was in fact obliged to be limited to a maximum permissible speed of a comparatively low level irrespective of its capability of driving at a higher speed from the standpoint of the machine's construction and the performance of the drive motor. There thus arose a problem of using the machine at a performance level much lower than the true possible performance level when the sewing operation included only a smaller relative movement amounts between the needle and the workpiece, which degraded the efficiency of the sewing operation uselessly. In order to eliminate this disadvantage, U.S. Pat. No. 4,108,093 discloses a means for of installing a speed control circuit capable of regulating the speed of the drive motor so as to raise it up to the maximum permissible speed in accordance with a sewing operation of various types of stitches including the least relative movement amounts, and letting a memory store predetermined maximum permissible speeds in accordance with each sewing operation mode. In this cited reference, selection and change of the maximum permissible speed in accordance with the selection of each stitch pattern become possible, because various maximum permissible speed data can be stored permanently or fixed according to the modes of the stitch patterns used.

This prior art was still not free from some disadvantages. In the event of embroidery being done in an industrial sewing machine, wherein the number of stitches exceeded 1,000 and the relative movements between the needle and the workpiece varied in many ways, the maximum permissible speed was obliged to be predetermined at a comparatively low level speed corresponded to the largest relative movement anticipated. This meant that a large scale complex embroidery pattern must be formed at a certain low level speed which is predetermined, leading to a deterioration of the sewing operation efficiency.

SUMMARY OF THE PRESENT INVENTION

A principal object of this invention is therefore to provide a sewing machine wherein a number of stitch instructions regarding a desired sewing operation, particularly a desired stitching pattern, are divided into a plurality of groups including a predetermined number of consecutive stitch instructions, and the rotation speed of a drive motor can be controlled by a permissible speed determined suitably per each group.

Another object of this invention is to provide a machine including stitch instruction storage means for storing data regarding the permissible speeds suitable to each group of a plurality of groups formed by dividing a number of stitch instructions beforehand so that each group may contain a certain constant number of instructions, and means for extracting or reading data regarding the permissible speeds in relation to extraction of stitch instructions, whereby the drive motor is automatically set at a permissible speed for the performance of each sewing operation according to the data in each group.

Another object of this invention is to provide a machine capable of synchronously extracting with the machine operation, more exactly with reciprocation of the needle, a temporary instruction-group composed of one stitch instruction which is to be executed next and predetermined number of instructions which follow and checking the temporary instruction-group to automatically determine the permissible speed of the drive motor according to the result of the checking.

Another object of this invention is to provide a method of sewing a workpiece including a step of dividing a large number of stitch instructions to form a desired stitch pattern into a plurality of stitch instruction groups, a step of determining a maximum permissible speed suitable to each of the stitch instruction groups, and a step of limiting the actual speed of the drive motor for reciprocating the needle of the sewing machine to the maximum permissible speed or less.

Still another object of this invention is to provide a machine of simple structure and a method of sewing a workpiece capable of efficiently forming a large size stitch pattern which is composed of a large number of stitches and which is varied in many ways as to the amount of relative movement between the needle and the workpiece when forming the stitch pattern.

For achieving these objects a sewing machine in accordance with this invention is provided with a central processing unit wherein a large number of stitch instructions stored in storage means are divided into a plurality of groups, and the stitch instructions in each group can be read synchronously with the sewing operation of the machine for generating the maximum permissible speed data suitable to the group.

The stitch instructions stored in the storage means direct, for example, the number of the driving pulses to two pulse motors for moving a work holder carrying the workpiece in the X axis and the Y axis, and rotation direction of the pulse motors. That is to say, the stitch instruction includes position data consisting of pulse number data and direction data for controlling variation of the relative position, i.e., relative movements between the needle and the workpiece. In order to effectively perform a desired sewing operation, a plurality of maximum permissible speeds are selectively set in the course of the sewing operation to be supplied to a speed control device as a speed command one after another. Setting of the maximum permissible speeds is carried out in the following two modes. In the first one, a large number of stitch instructions are divided into a plurality of groups and the maximum permissible speed is determined for each group according to an instruction where the variation amount of the relative position is the largest, or according to whether or not a stitch instruction directing the relative movement amount to exceed a predetermined value is in each group. The predetermined maximum permissible speed data is, together with the stitch position data in the corresponding group, stored in the stitch instruction storage means for being extracted therefrom in regard to the synchronous extracting operation of the stitch instructions with the sewing operation of the machine. The maximum permissible speed data may either be determined by the operator when the stitch instructions are made before being given to each stitch instruction group, or may be automatically determined by the central processing unit such as a micro-processor before being given to each stitch instruction group, for example, when the stitch instructions which do not include maximum permissible speed data are transferred from a permanent storage means such as a magnetic card to a stitch instruction storage means in the sewing machine. It is also possible that maximum permissible speed data be determined, based on scanning of the stitch instruction group next to be executed, at every completion of a sewing operation by one stitch instruction group, to be a suitable value for the scanned group.

In the second mode, which is a step improved from the first one, a temporary instruction-group, composed of one stitch instruction which is to be executed next and a succeeding predetermined number of stitch instructions is formed and checked by the central processing unit, synchronously with the machine operation. The maximum permissible speed may be, based on a stitch instruction where the relative movement between the needle and the workpiece is the largest, automatically determined by and set in the central processing unit. In this case, the maximum permissible speed is determined by selecting from among predetermined plural maximum permissible speed data according to the largest relative movement, or by calculating based on the largest relative movement, in the central processing unit. The maximum permissible speed also may be automatically determined depending on discrimination whether or not a stitch instruction directing the relative movement to exceed a predetermined value is in the temporary instruction group. In other words, a number of stitch instructions are divided into a number of temporary groups, in this machine, wherein the constituent instruction members thereof are replaced one by one in order. The checking of the predetermined number of stitch instructions is executed by the central processing unit such as a microprocessor in a very rapid and accurate manner. The system of this mode allows searching or scanning of a stitch instruction corresponding to a large relative movement to be finished a certain time earlier (time in which the predetermined number of stitch instructions are executed) than it is actually executed, which consequently allows that much more delay of the speed control due to the inertia in the mechanical parts of the machine. This made effectively contributes to accurateness and neatness of the finished stitch pattern.

The characteristics of this invention include that the maximum permissible speed in a desired sewing operation is not determined at a certain fixed value based on the largest relative movement throughout the course of the sewing operation, but is determined at the most suitable maximum permissible speed for each group of the predetermined number of stitch instructions. This invention thus allows formation of a large size stitch pattern, wherein a large number of stitches are varied in many ways as to relative movements, to be executed effectively and neatly. Other features and objects of this invention will be understood from the following description of the preferred embodiments.

DETAILED DESCRIPTION OF THE PREFERRED EMBODIMENTS

Figure 1:
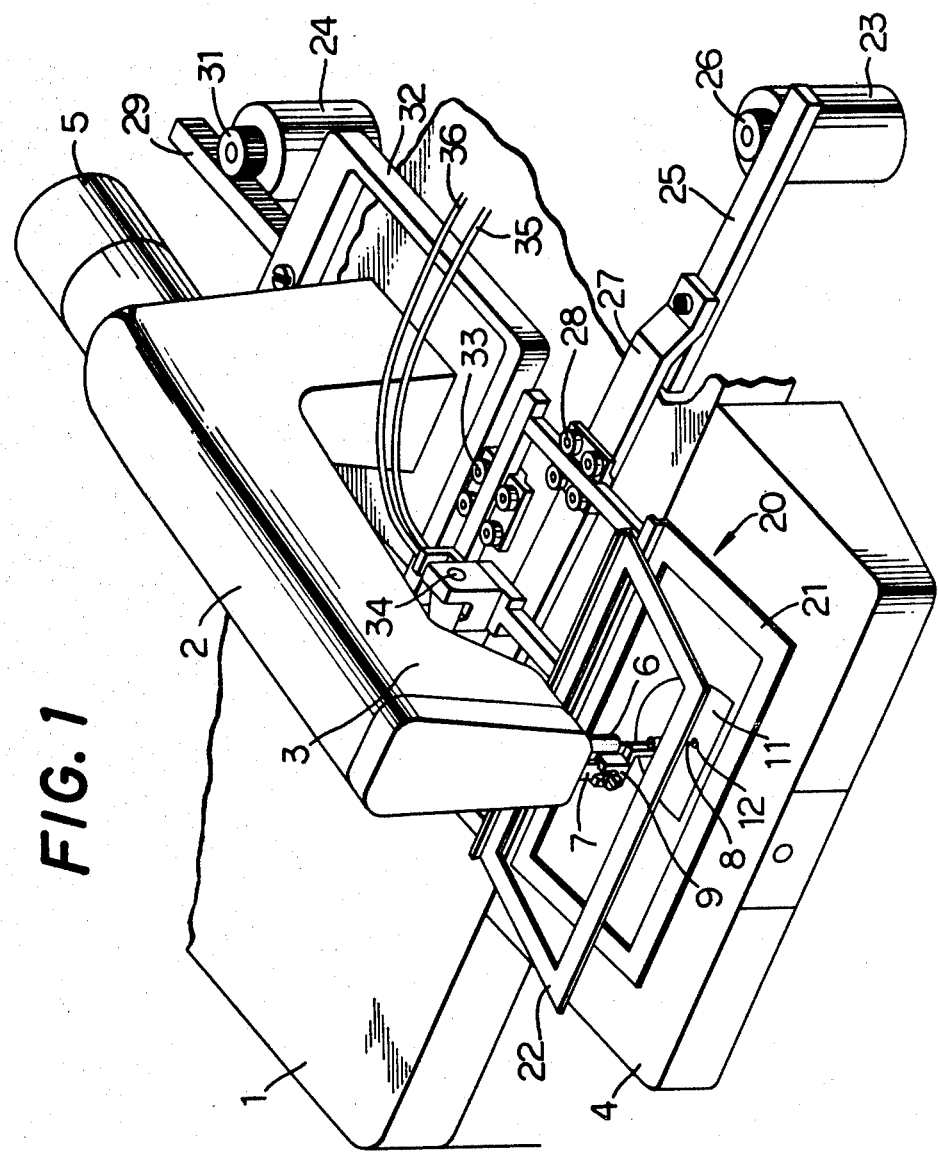
FIG. 1 is a general perspective view of an embodiment of a sewing machine of this invention.

On a bed 1, as can be seen in FIG. 1, a bracket arm 2 is installed of hanging over the edge thereof. A head 3 of the bracket arm 2 is located just above a table 4 projecting forwardly from the bed 1. On the head 3 a needle bar 6, which is driven by a drive motor 5 to be vertically reciprocated, and a presser bar 7, which is moved up and down as necessary, are mounted. On the lower end of the needle bar 6 a needle 8 is attached, and on the lower end of the presser bar 7 a presser foot 9 is attached. Below those members a throat plate 11 is placed such that a needle aperture 12 thereof is positioned directly beneath the needle 8.

In this sewing machine a work fabric (hereinafter called workpiece) is held sandwiched between a lower frame 21 and an upper frame 22 of a work holder 20 to be moved relative to the needle 8, while the needle 8 is above the upper surface of the bed 1, to be more exact, above the upper surface of the table 4, by virtue of an X pulse motor 23 and a Y pulse motor 24. A pattern forming mechanism is thus formed by those members. The lower frame 21 is connected to a movable member 27 which is movable parallel to X axis (in lateral direction) and is driven by the pulse motor 23 via a rack 25 and a pinion 26. It is slidable also on the movable member 27 due to the action of rollers 28 in the direction of Y axis (forward and backward). The lower frame 21 is connected to another movable member 32 which is movable in parallel to the Y axis and is driven by the pulse motor 24 via a rack 29 and a pinion 31, being similarly slidable on the movable member 32 due to the action of rollers 33 in the X axis direction. The lower frame 21 is, due to the just mentioned structure, movable parallel to the X axis and the Y axis on the bed 1 according to the rotational direction and angle of the pulse motors 23 and 24, while the upper frame 22 is swingably attached about a rotation shaft (or pin) 34 for being relatively swingable up and down to the lower frame 21 due to the action of a known driving means (not shown) which is connected with the upper frame 22 via a pair of flexible cables 35 and 36. The upper and lower frames 22, 21 are for holding in a forced contact the workpiece therebetween and releasing the same.

Figure 2:
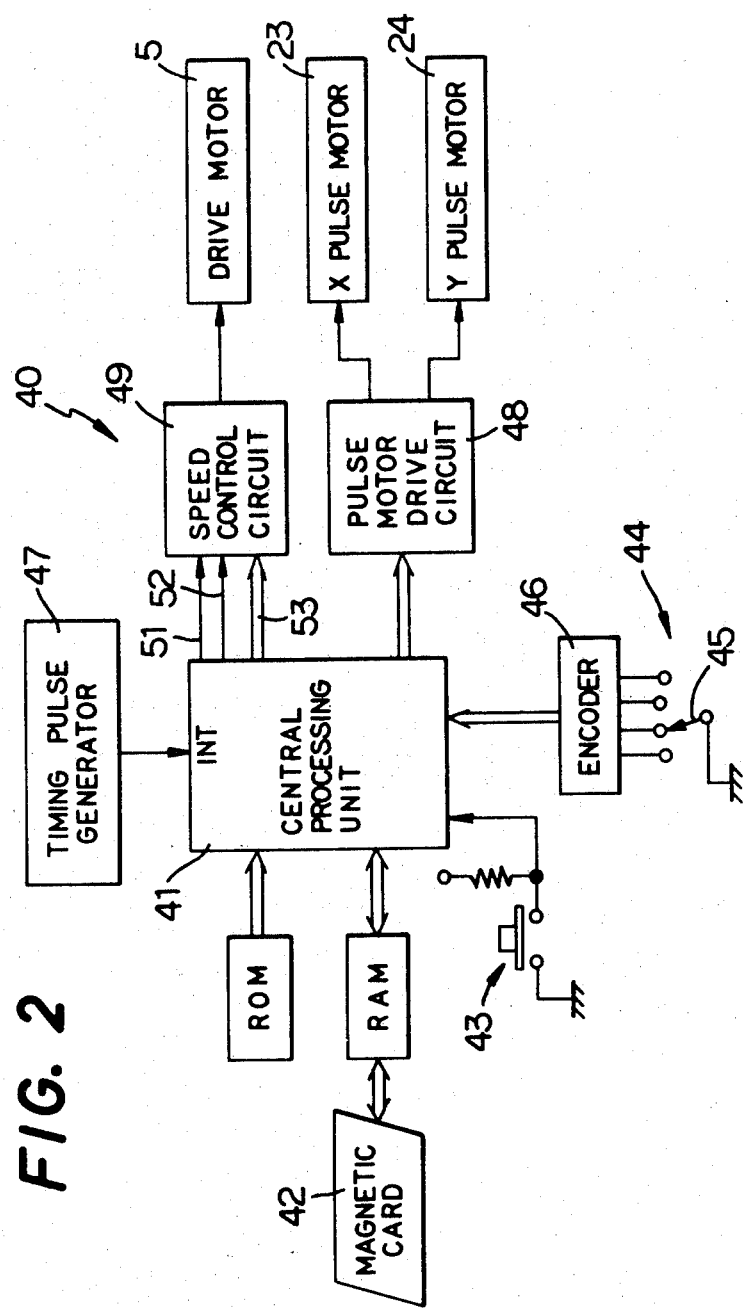
FIG. 2 is a general block diagram showing a control system of the machine in FIG. 1.

The machine is by a control system 40 illustrated in FIG. 2 to automatically perform sewing operations. As can be seen in FIG. 2, a central processing unit 41 is provided with a permanent storage means ROM (read-only memory) for storing program instructions or the like and a temporary storage means RAM (random access member) for storing stitch instructions or the like read out from a magnetic card 42 in order to provide the same to the central processing unit 41, storing output data from the central processing unit 41 or providing output data to the magnetic card 41.

To the central processing unit 41 a main switch 43 operable to start and stop the drive motor 5 and a speed divider device 44 are connected, the latter including an encoder 46 provided with four input terminals which may be selectively grounded by means of a selector switch 45. By operating the selector switch 45 speed division data indicating the division ratio variable in four steps can be provided to the central processing unit 41.

To an interruption terminal INT of the central processing unit 41 a timing pulse generator 47 is connected to generate a timing signal synchronously with vertical reciprocative movement of the needl 8. Whenever a timing signal is provided to the interruption terminal INT, the central processing unit 41 provides a pulse motor drive circuit 48, which is a drive means of a pattern forming mechanism, stitch instruction, which causes the X pulse motor 23 and the Y pulse motor 24 to be driven and simultaneously a speed control circuit 49 to be provided with a speed command 51. This speed command 51 is for controlling the drive motor 5 whether it should be rotated at a predetermined low speed (200 e.g., r.p.m.) or at a permissible higher speed directed by permissible speed data consisting of speed division data 53 from the speed divider device 44 and the maximum permissible speed data 52. By way of examples, the maximum permissible speed data 52 is given as a permissible value of 2000 r.p.m., while the amount of relative movement of the work holder 20 relative to the needle 8 is within a range of up to 3 mm, and as a permissible speed of 1000 r.p.m. when the relative movement amount exceeds 3 mm. The speed control circuit 49 determines the rotation speed of the drive motor 5 based on permissible speed data consisting of the maximum permissible speed data and the speed division data 52 from the speed divider device 44. In other words, when the maximum permissible speed is 2000 r.p.m. the rotation speed of the motor 5 is determined, according to the selected contact position of the selector switch 45 which depends upon the content and state of the sewing operation, for example to any one of the four steps of 2000, 1500, 1000, and 500 r.p.m. It will be determined, when the maximum permissible speed is 1000 r.p.m., for example, to any one of the four steps of 1000, 750, 500, and 250 r.p.m. The drive motor 5 is placed under control to be rotated at the thus determined or decided speed.

An interruption routine shown in FIG. 3 for controlling the operation of the first embodiment will be explained.

The interruption routine is, along with a main program for controlling the whole sewing operation, fixedly stored in the ROM to be executed by temporarily interrupting the main program every time a pulse from the timing pulse generator 49 is provided to the central processing unit 41. The main program has nothing directly to do with this invention, and any conventional automatic program used in an ordinary automatic sewing machine will do, thus requiring no further comments thereon.

When a power source switch of the machine is turned ON, stitch instructions in the magnetic card 42 are transferred to the RAM and stored at each address of the RAM as shown in Table 1, starting from the address 2100.

TABLE 1

| Address | Data | | Remarks |
|---|---|---|---|
| 2100 | 01110111 | 77 | On one surface alone |
| 1 | 00111000 | 38 | All stored below are true instructions |
| 2 | 01010000 | 50 | |
| 3 | 00101100 | 2C | X homing position |
| 4 | 00000000 | 00 | |
| 5 | 01100001 | 61 | Y homing position |
| 6 | 00000000 | 00 | |
| 7 | 00000000 | 00 | Key code |
| 8 | 10001111 | 8F | |
| 9 | 11110000 | F0 | (15, 0) |
| A | 01011000 | 58 | |
| B | 01111010 | 7A | (7, −10) |
| C | 01011000 | 58 | |
| D | 11010010 | D2 | (13, −2) |
| E | 11011000 | D8 | |
| . | . | . | |
| D | 11110000 | F0 | (15, 0) |
| E | 11011000 | D8 | |
| F | 00000000 | 00 | Key code |
| 2120 | 00001111 | 0F | |
| 1 | 11101001 | E9 | (14, −9) |
| 2 | 11011000 | D8 | |
| 3 | 11100101 | E5 | (14, −5) |
| 4 | 11011000 | D8 | |
| . | . | . | |
| 2129 | 00011101 | 1D | (1, −13) |
| A | 11010000 | D0 | |
| B | 00000000 | 00 | Key code |
| C | 10001111 | 8F | |
| D | 00101110 | 2E | (2, −14) |
| E | 11010000 | D0 | |
| F | 00101110 | 2E | (2, −14) |
| 2130 | 01010000 | 50 | |
| 1 | 00101110 | 2E | (2, −14) |
| 2 | 01011000 | 58 | |
| 3 | 00000000 | 00 | End code |
| 4 | 10000000 | 80 | |

At the address 2100 of the RAM, is stored the data indicating whether the stored data on each address starting from the address 2103 are stored on one face alone or on both faces of the magnetic card 42. At the addresses 2101 and 2102, is stored the data signifying that all of the data stored at the address 2103 and the subsequent are true instructions. Each instruction is composed of the data at two addresses of the RAM forming a block. The instructions at the addresses 2103 and 2104 represents an X homing position, that is the number of pulses required to move the work holder 20 in the X axis direction from the reference position or origin to the X homing position. The instructions at the addresses 2105 and 2106 represents a Y homing position. When lower 4 bits of the upper address in one block is "1111" as at the address 2108 in Table 1, it signifies that the data at those addresses is key code data, and the uppermost 2 bits of the upper address is the maximum permissible speed data. The maximum permissible speed data is predetermined depending on whether instruction directing a relative movement amount exceeding 3 mm is includes among the instructions within 5 blocks of addresses following the key code data or not. If "YES" 1000 r.p.m. is commanded by "00", and "NO" 2000 r.p.m. is commanded by "10" as the maximum permissible speed data.

The stitch instruction in each of the 5 blocks following the key code data is a stitch instruction which includes pulse number data, drive control data, direction data, etc. The pulse number data represents the number of pulses for moving the work holder 20 in the X axis direction and the Y axis direction and the direction data represents movement direction of the work holder 20. That is to say, the pulse number data and the direction data compose a position data representing variation of the relative position, i.e., the amount of relative movement between the needle 8 and the work holder 20. For example, the upper 4 bits of the 2109 address are the pulse number data in the X axis direction, and the lower 4 bits are the pulse number data in the Y axis direction. The upper 2 bits of the 210A address is drive control data, whose contents are shown in Table 2.

TABLE 2

| Data | Contents of data |
|---|---|
| 0 1 | Low speed drive |
| 1 1 | High speed drive |
| 0 0 | Stopping |
| 1 0 | End |

The following 2 bits of the 210A address is direction data, wherein the upper bit is for the Y axis direction and the lower bit is for the X axis direction, and "0" indicates the negative or backward direction and "1" the positive or forward direction.

When the operation of the machine is allowed by an operation of the main switch 43, after the transfer of data from the magnetic card 42 to the RAM has been finished, the pulse motors 23 and 24 are driven based on the number of pulses in the X axis direction at the addresses 2103 and 2104 and the number of pulses in the Y axis direction at the addresses 2105 and 2106 so as to move the work holder 20 holding the work therein from the reference position to the homing position.

At the moment when the movement is finished the drive motor 5 is started. Providing of a timing signal from the timing pulse generator 47 to the interruption terminal INT of the central processing unit 41 causes the interruption routine in FIG. 3 to be executed under temporary suspension of the main program execution. Every time the interruption routine is started an address counter designates each block of two consecutive addresses of the RAM in order to make the central processing unit 41 temporarily store the instruction of the designated addresses at a working area of the RAM which is provided for temporarily storing processed result data by the central processing unit 41 and input data thereto. Upon initial execution of the interruption routine, the instruction of the addresses 2107 and 2108 are read out or extracted for being temporarily stored at the working area. The temporarily stored instruction is discriminated at a step S11 whether it is an end code data or not. Since it is no end code data, the execution is advanced to the next step, a step S12, where the instruction is discriminated as to whether or not it is key code data. Since the instruction transferred from the addresses 2107 and 2108 to the working area is key code data, the address counter increases the contents thereof at a step S13 and makes the instruction from the addresses 2109 and 210A, which is then designated, to be stored at the working area. Furthermore, the maximum permissible speed data "10", which represents 2000 r.p.m., is stored at a step S14 in a temporary memory TM of the working area. Then, at a step S15, drive control data in the instruction transferred from the addresses 2109 and 210A is discriminated as to whether or not it is high speed drive data. Since it is low speed drive data of "01", a speed command 51 from the central processing unit 41 is provided at a step S16 as a command of low speed drive. Under this command, the drive motor 5 is rotated at a low speed of 200 r.p.m. by means of the speed control circuit 49. Soon after generation of the low speed drive command, position data (15, 0) in the X- and Y-axis directions are provided at a step S17 from the central processing unit 41 for driving the pulse motors 23 and 24 according to the above-mentioned position data. The work holder 20 moved by the pulse motors 23 and 24 allows a 3 mm seaming parallel to the X axis to be made in the work. The execution is returned to the main program after the termination of the step 17 for providing the position data.

When the next timing signal is applied to the central processing unit 41, the addresses 210B and 210C are designated in that order by the address counter to read out the instructions thereof, the main program being so designed as to proceed accordingly. Since this is neither end code data nor key code data, discrimination whether or not the drive control data in the instruction is high speed drive data is made instantly at the step S15. Since the drive control data in the address 210C is "01", the speed command 51 from the central processing unit 41 is provided again as a low speed drive command for maintaining the drive motor 5 at 200 r.p.m. To the pulse motor drive circuit 48, position data of (7, −10) is provided for forming the corresponding seam on the work.

At the next input of a timing signal to the central processing unit 41 the instruction at the addresses 210D and 210E is extracted. As the drive control data in the instruction is high speed drive data of "11", the speed command 51 directing a high speed drive and the maximum permissible speed data 52 of 2000 r.p.m. stored in the temporary memory TM are provided, through an execution of steps S18 and S19, from the central processing unit 41 to the speed control circuit 49. This speed control circuit 49 determines a commanding speed to the drive motor 5, in response to the speed command 51, based on the maximum permissible speed data 52 and the speed division data 53 from the speed divider device 44. In other words, when the selector switch 45 is, for example, at the second position as shown in FIG. 2, the speed determination will fall on the second among the four steps of speed selection 2000, 1500, 1000 and 500 r.p.m., i.e., 1500 r.p.m. The commanded speed to the drive motor 5 will be raised from the present 200 r.p.m. up to the newly determined 1500 r.p.m.

Hereinafter the sewing operation is continued at the speed of 1500 r.p.m. But key code data including "00", i.e., 1000 r.p.m. for the maximum permissible speed data 52 will be read out as sewing progresses. The key code data at the addresses 211F and 2120 is an example. This is because the data "00" has been previously stored, prospecting a case wherein the relative movement of the needle 8 and the work holder 20 exceeds 3 mm as specified at the address 2121 within five blocks following the key code data. When this maximum permissible speed data 52 representing 1000 r.p.m. is read out the stored data "10" in the TM of the RAM will be changed to "00", i.e., the maximum permissible speed is changed from 2000 r.p.m. to 1000 r.p.m. Therefore, the sewing operation according to the instructions from the five blocks including the address 2121 is carried out at the second speed 750 r.p.m. out of the four steps of 1000, 750, 500 and 250 r.p.m.

When end code data is read out, as at the addresses 2133 and 2134, after a continuation in sewing operation of this manner, a step S20 is executed for generating a command for stopping the machine drive from the central processing unit 41 so as to terminate one sewing operation.

Operation mode of a second embodiment of this invention now will be described. An interruption routine, shown in FIG. 4 for the second embodiment, is fixedly stored in the ROM along with the main program.

Upon turning ON a power source switch, instructions in the magnetic card 42 are stored in order at the address 2100 and the following addresses of the RAM as shown in Table 3.

TABLE 3

| Address | Data | | Remarks |
|---|---|---|---|
| 2100 | 01110111 | 77 | On one surface alone |
| 1 | 00111000 | 38 | All stated below are true instructions |
| 2 | 01010000 | 50 | |
| 3 | 00101100 | 2C | |
| 4 | 00000000 | 00 | X homing position |
| 5 | 01100001 | 61 | |
| 6 | 00000000 | 00 | Y homing position |
| 7 | 11110000 | F0 | (15, 0) |
| 8 | 01011000 | 58 | |
| 9 | 01111010 | 7A | (7, −10) |
| A | 01011000 | 58 | |
| B | 11010010 | D2 | (13, −2) |
| C | 11011000 | D8 | |
| 210D | 11100001 | E1 | (14, −1) |
| E | 11010000 | D0 | |
| F | 11110000 | F0 | (15, 0) |
| 2110 | 11010000 | D0 | |
| . | . | . | |
| . | . | . | |
| . | . | . | |
| 2119 | 11110000 | F0 | (15, 0) |
| A | 11011000 | D8 | |
| B | 11101001 | E9 | (14, −9) |
| C | 11011000 | D8 | |
| D | 11100101 | E5 | (14, −5) |
| E | 11011000 | D8 | |
| . | . | . | |
| . | . | . | |
| . | . | . | |
| 2123 | 00011101 | 1D | (1, −13) |
| 4 | 11010000 | D0 | |
| 5 | 00101110 | 2E | (2, −14) |
| 6 | 11010000 | D0 | |
| 7 | 00101110 | 2E | (2, −14) |
| 8 | 01010000 | 50 | |
| 9 | 00101110 | 2E | (2, −14) |
| A | 01011000 | 58 | |
| B | 00000000 | 00 | End code |
| C | 10000000 | 80 | |

The instructions stored at the addresses from 2100 to 2106 of the RAM are identical to those in the previous embodiment, and are also identical to the situation in the previous embodiment in that the data at every two addresses are bound into one block. However, the instructions in Table 3 do not include an instruction corresponding to the key code data as in the previous embodiment. While in the previous embodiment the maximum permissible speed is previously determined one for the stitch instructions in each group of five blocks, in the interruption routine shown in FIG. 4 the maximum permissible speed is determined in parallel to or simultaneously with the extraction of the stitch instructions.

Movement of the work holder 20 to the homing position takes place in response to the operation of the main switch 43, followed by starting of the drive motor 5. Then a timing signal from the timing pulse generator 47 to the central processing unit 41 starts execution of the interruption routine of FIG. 4.

Figure 3:
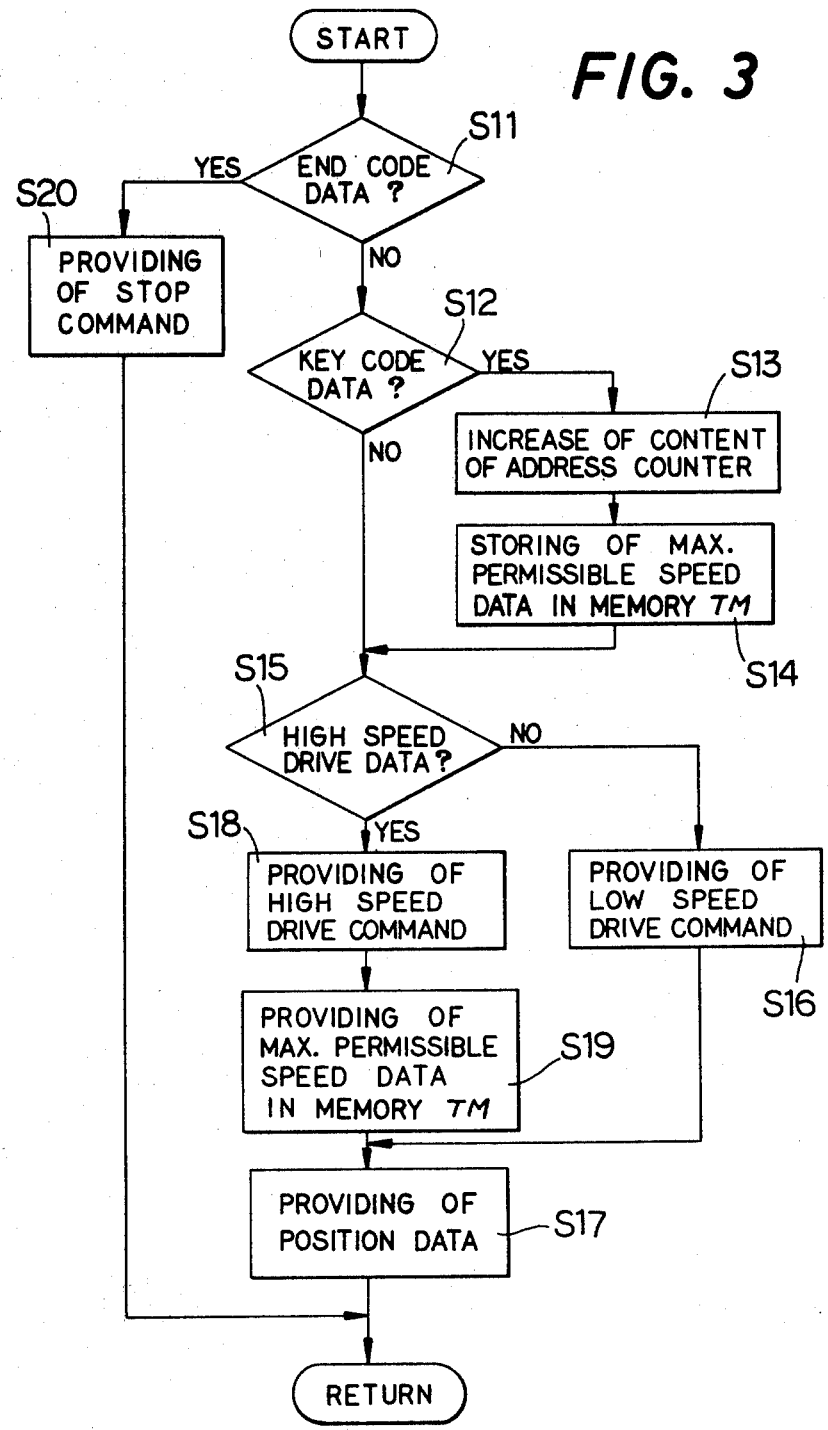
FIG. 3 is a flow chart showing an example of an interruption routine for generating the maximum permissible speed data in the machine of FIG. 1.
Figure 4:
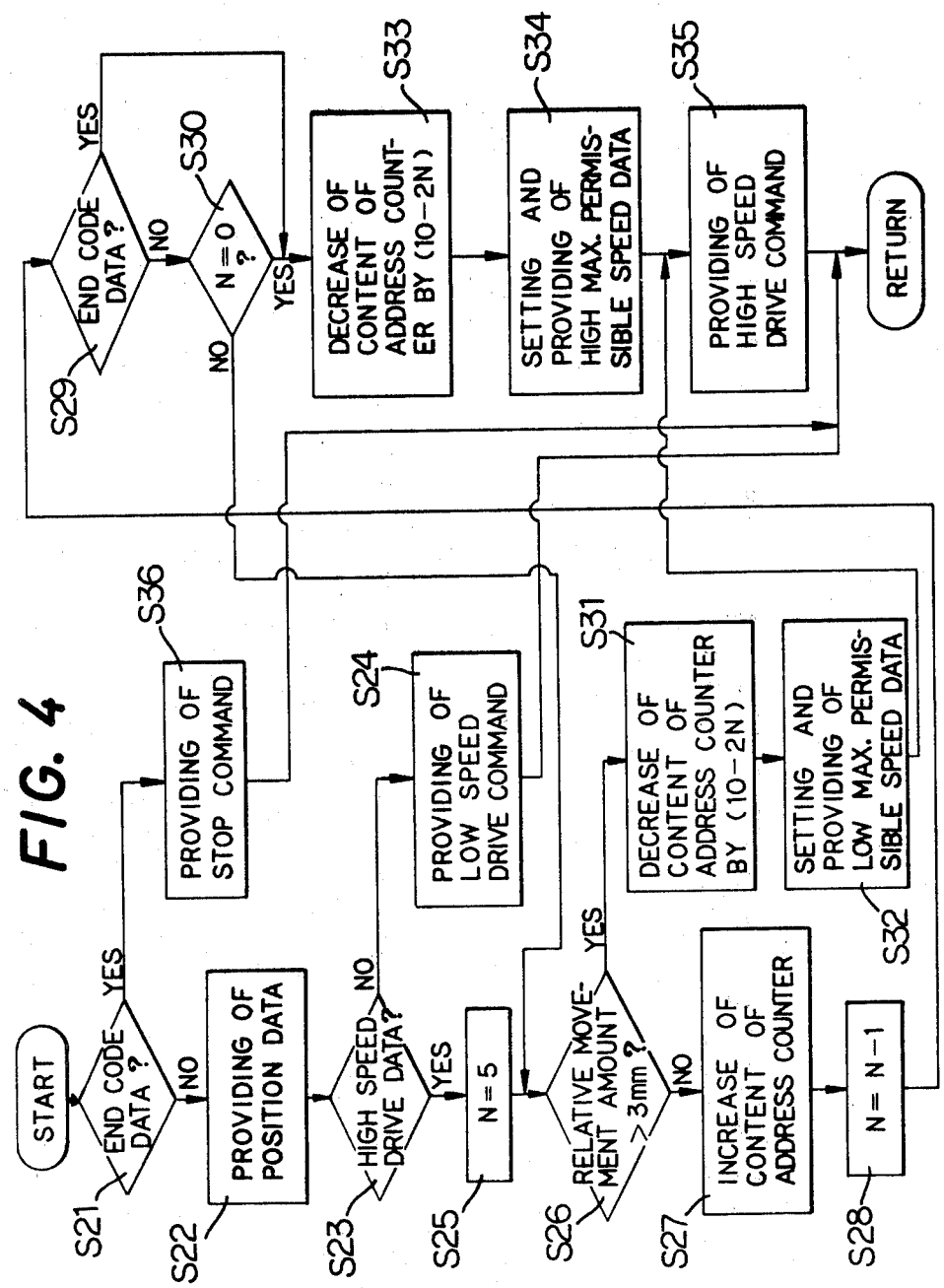
FIG. 4 is a flow chart showing another example of an interruption routine for generating the maximum permissible speed data in the above machine of FIG. 1.

Whenever the interruption routine of FIG. 4 is started, two consecutive addresses in the RAM of Table 3 are designated in order by the address counter, just as in the case of the interruption routine of FIG. 3, so that the stitch instructions in those addresses are temporarily stored in the working area of the RAM. What is stored first at this time is the instruction at the addresses 2107 and 2108. Based on a discrimination at a step S21 that the then stored instruction is not end code data, position data in the stitch instruction is first applied to the pulse motor drive circuit 48 at a step 22. discrimination whether or not the drive control data in the stitch instruction, that is the data of the uppermost 2 bits of the address 2108, is high speed drive data is executed at a step S23. As the drive control data is "01" representing low speed drive data, a low speed drive command is provided from the central processing unit 41 at a step S24. The speed control circuit 49 will, upon receiving this command, rotate the drive motor 5 at the speed of 200 r.p.m. As the work holder 20 is already moved to the homing position in response to the pulse number data in the X- and Y-axis directions, a desired stitch may be made in the workpiece.

As the drive control data included in the stitch instruction at the addresses 2109 and 210A, which is extracted in response to the next timing signal, is also "01", a low speed drive data, another stitch is formed while the drive motor 5 is maintained at the low speed rotation of 200 r.p.m.

As the drive control data included in the stitch instruction at the addresses 210B and 210C, which is extracted in response to the next timing signal, is "11", that is high speed drive data, a process for determining the maximum permissible speed is executed. In other words, a step S25 is executed followed by setting of the numerical content N of the internal counter of the central processing unit 41 at "5", and discrimination whether or not the relative movement amount between the needle 8 and the work holder 20 which takes place owing to the position data from the address 210B exceeds 3 mm or not is done at a step 26. The result of the discrimination shows "NO", so the address counter is increased in its content as to designate the addresses 210D and 210E at a step S27, the content of the internal counter being decreased by one to be "4" at a step 28. then discrimination, whether or not the instruction extracted from the addresses 210D and 210E in response to the increase of the content of the address counter is end code data, is executed in a step S29. As the discriminated data is not end code data, a next discrimination whether or not the content of the internal counter is "0" is executed at a step S30. Since the numerical content shows "4" instead of "0", another discrimination whether or not the relative movement amount between the needle 8 and the work holder 20 exceeds 3 mm is executed at the step 26.

The above-mentioned process ranging from the step S26 to the step S30 is repeated until the numerical content of the internal counter becomes "0". In other words, whether or not the position data directing the relative movement amount between the needle 8 and the work holder 20 exceeding 3 mm is included (like the data at the address 211B) in the stitch instructions stored in the five blocks from the addresses 210B, 210C to the addresses 2113, 2114 is checked. If the result shows "YES" the content of the address counter is decreased by (10-2N) through execution of a step S31, and the lower maximum permissible speed of 1000 r.p.m. is set for being provided at a step S32. If no relative movement amount exceeding 3 mm is included in the instructions the content of the address counter is, through execution of a step S33, decreased by (10-2N), and the higher maximum permissible speed of 2000 r.p.m. is set for being provided at a step 34, and the maximum permissible speed data 52 is generated to provide a high speed drive command as the speed command 51 through a step S35. The speed control circuit 49 will determine, in response to this high speed drive command, the commanding speed to the drive motor 5, by means of the above-mentioned maximum permissible speed data 52 and the speed division data 53 from the speed divider device 44, for rotating the drive motor 5 at this commanded speed. Herewith one stitch of a desired stitch pattern according to the stitch instruction from the addresses 210B, 210C can be formed.

Since the content of the address counter is decreased, as mentioned above, by (10-2N), the address to be next designated is returned from the address 2116 to the address 210C by the decrease in the content of the address counter by 10 (because N=0).

Whenever a timing signal is applied to the central processing unit 41 the same operation as previously mentioned is repeated, so that the drive motor 5 is limited to 1000 r.p.m. or less while at least one instruction representing the amount of movement exceeding 3 mm between the needle 8 and the work holder 20 exists in the group consisting the next executed stitch instruction and the four succeeding stitch instructions. When there is no instruction representing the excess of 3 mm the drive motor 5 is allowed to operate at the maximum permissible speed of 2000 r.p.m. or less. It means that when more than 3 mm of relative movement appears within the five instructions starting from the next executed instruction, while the drive motor 5 is rotated at the maximum permissible speed of 2000 r.p.m., the drive motor 5 begins to be regulated down to 1000 r.p.m. Even when some delay takes place in the machine due to the inertia of the mechanical parts thereof, the rotation speed of the drive motor 5 upon actual formation of a stitch exceeding 3 mm is already lowered to 1000 r.p.m. exactly. This ensures formation of exact stitches, to great advantage to the users.

After formation of the predetermined number of stitches in the above-mentioned manner, an extraction of end code data from the addresses 212B, 212C will cause the central processing unit 41 to provide a stop command through execution of a step S36 to terminate one course of sewing operation.

Figure 5:
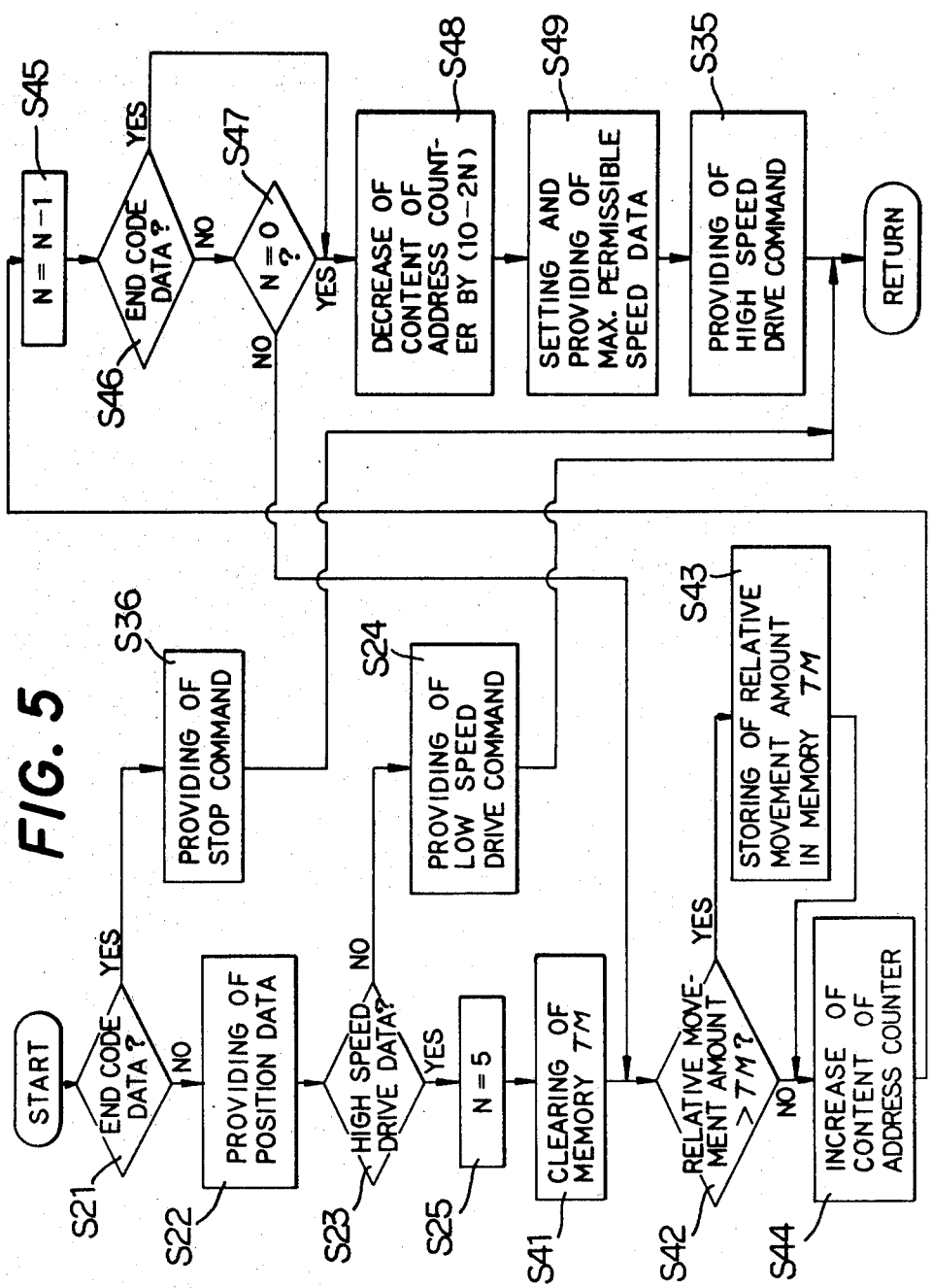
FIG. 5 is another example of a flow chart showing an interruption routine for generating the maximum permissible speed data in the machine of FIG. 1.

An interruption routine for controlling operation of the third embodiment of this invention is shown in FIG. 5. Same steps as in the interruption routine for the second embodiment are allotted the same signs for the sake of convenience.

The interruption routine illustrated in FIG. 5 is started every time a timing signal is provided to the central processing unit 41 from the timing pulse generator 47. Discrimination of end code data and providing of position data are executed at a step S21 and a step S22, and discrimination whether or not drive control data in the stitch instruction is high speed drive data is executed at a step S23. When the drive control data is high speed drive data the numerical content N of the internal counter in the central processing unit 41 is set at "5" at a step S25. Subsequently the content of the temporary memory TM in the RAM is cleared at a step S41 for checking the stitch instruction at the actually designated addresses. That is to say, whether or not the relative movement amount between the needle 8 and the work holder 20 according to the position data of the stitch instruction is larger than the content of the temporary memory TM is checked at a step S42. When the relative movement amount is larger than the content of the temporary memory TM, a step S43 is executed for storing the relative movement amount in the temporary memory TM, followed by an execution of a step S44. On the contrary, when the relative movement is smaller than the content of the temporary memory TM, the step S44 is immediately executed. Due to the execution of the step S44 the content of the address counter is increased so as to designate in order the succeeding addresses where the subsequent stitch instruction is stored. Then the content N of the internal counter is decreased by one at a step S45, and checking whether or not the instruction in the designated addresses by the address counter is end code data is executed at a step S46. If the result shows "NO", a step S47 is executed for checking whether or not the content N of the internal counter is zero; when the result shows "YES", execution of a step S48 follows.

A series of steps from the step S42 to the step S47 is repeatedly executed, until the content N of the internal counter becomes zero, for checking one by one the relative movement amounts directed by the position data in the stitch instructions stored in five blocks each containing two addresses, and the thus determined greatest amount of relative movement is stored in the temporary memory TM. After searching for the greatest relative movement amount the step S48 is executed to decrease the content of the address counter by (10-2N). At a step S49 the maximum permissible speed suitable to the greatest relative movement amount in the temporary memory TM is determined to be provided. The high speed drive command is then generated at a step 35. By means of this process, at every generation of a timing signal, stitch instructions in five blocks are checked by searching the greatest amount of relative movement. According to the thus determined greatest amount of relative movement the maximum permissible speed is determined. When there are two kinds of maximum permissible speeds, as in the second example, i.e., 2000 r.p.m. and 1000 r.p.m., either one of the two may be selected according to the thus determined greatest amount of relative movement. As still another embodiment, the maximum permissible speed may be computed based on the thus determined greatest amount of relative movement in the central processing unit 41, if the program at the step S49 is so set.

It goes without saying that this invention can be practice in other ways than the embodiments described above in detail. For example, the interruption routine can be modified so that the maximum permissible speed may be set in three steps or more. Another variation of the structure of the stitch pattern forming mechanism to a combination of a jogging mechanism to give lateral oscillation to the needle and a feeding mechanism for controlling the feed dog in the direction and amount of feeding is also possible.

While the invention has been described in detail above, it is to be understood that this detailed description is by way of example only, and the protection granted is to be limited only within the spirit of the invention and the scope of the following claims.

What is claimed is:

1. In an automatic sewing machine having
stitch forming instrumentalities including an endwise reciprocatory needle,
a drive motor for reciprocating the needle to produce stitches in a workpiece,
drive means operative to vary the relative position between the needle and the workpiece,
stitch instruction storage means for storing stitch instructions capable of influencing the said relative positions to form a stitch pattern,
means operative synchronously with reciprocation of the needle for extracting the stitch instructions from the stitch instruction storage means in a predetermined sequence, and
position control means responsive to the extracted stitch instructions for controlling operation of the drive means between successive stitches in the stitch pattern,
the improvement comprising:
program storage means for permanently storing a series of program instructions containing a group forming instruction for forming a temporary group of stitch instructions from the stitch instructions stored in said stitch instruction storage means, a scanning instruction for scanning said temporary group to examine variation of said relative position between successive stitches to be produced according to said temporary group, and a speed determining instruction for determining a maximum permissible speed of said drive motor depending on the result of the examination, said temporary group consisting of said extracted stitch instruction and a predetermined number of instructions to be extracted in said predetermined sequence following said extracted stitch instruction;
processing means operative synchronously with reciprocation of said needle for performing said series of program instructions and generating permissible speed data related to said maximum permissible speed; and
speed control means responsive to said permissible speed data for limiting actual speed of said drive motor to said maximum permissible speed or less during production of one stitch according to said extracted stitch instruction.

2. The improvement according to claim 1, further comprising:
manual means operative to select one from among a plurality of predetermined ratios for dividing said maximum permissible speed,
whereby said permissible speed data is generated by said processing means on the basis of the selected ratio and said maximum permissible speed.

3. The improvement according to claim 1, wherein said processing means stops the generation of said permissible speed data and provides to said speed control means low speed data related to a constant speed substantially slower than said maximum permissible speed while a predetermined number of stitches are being produced at the beginning and at the end of said stitch pattern.

4. The improvement according to claim 3, wherein each of said stitch instructions includes position data representing said relative position and drive control data associated with said position data, and said processing means selectively generates said low speed data and said permissible speed data in accordance with said drive control data.

5. The improvement according to claim 1, wherein said processing means scans each of said stitch instructions in said temporary group to compare each of said variations of said relative positions with a predetermined value and generates first permissible speed data representing a high maximum permissible speed when all of said variations related to said temporary group are the predetermined value or less and second permissible speed data representing a low maximum permissible speed when at least one of said variations related to said temporary group is above the predetermined value.

6. The improvement according to claim 1, wherein said processing means includes stitch instruction scanning means for extracting stitch instructions from said stitch instruction storage means in said predetermined sequence in a period substantially shorter than the reciprocation period of said needle and counter means for counting the number of stitch instructions extracted by said stitch instruction scanning means, and generates said permissible speed data when said predetermined number of stitch instructions are extracted by said stitch instruction scanning means.

7. In an automatic sewing machine having
stitch forming instrumentalities including an endwise reciprocatory needle,
a drive motor for reciprocating the needle to produce stitches in a workpiece,
drive means operative to vary the relative positions between the needle and the workpiece,
the improvement comprising:
storage means for storing a plurality of permissible speed data and a plurality of groups of stitch instructions capable of influencing said relative positions, said permissible speed data being determined corresponding to each of the stitch instruction groups depending on variation of said relative position between successive stitches to be produced according to each of said stitch instruction groups;
means operative synchronously with reciprocation of the needle for extracting the stitch instructions from said storage means in a predetermined sequence and for extracting said permissible speed data therefrom simultaneously with extraction of an initial instruction in each of said groups;
processing means operative synchronously with reciprocation of said needle for discriminating said extracted permissible speed data from said extracted stitch instructions and storing said extracted permissible speed data during extraction of all stitch instructions in each of said groups; and
speed control means for limiting actual speed of said drive motor to no more than a maximum permissible speed represented by said permissible speed data stored by said processing means.

8. A method of sewing a workpiece with an automatic sewing machine, the automatic sewing machine having stitch forming instrumentalities including an endwise reciprocatory needle, a drive motor for reciprocating the needle to produce stitches in a workpiece, drive means operative to vary the relative position between the needle and the workpiece, stitch instruction storage means for storing stitch instructions capable of influencing the said relative position to form a stitch pattern, means operative synchronously with reciprocation of the needle for extracting stitch instructions from the stitch instruction storage means in a predetermined sequence, and position control means responsive to the extracted stitch instructions for controlling operation of the drive means between successive stitches in the stitch pattern, the method comprising the steps of:
dividing said stitch instructions stored in said stitch instruction storage means into a plurality of stitch instruction groups;
scanning each of said stitch instruction groups to examine variation of said relative position between successive stitches to be produced;
determining a maximum permissible speed corresponding to each of said stitch instruction groups depending on the result of the examination;
generating permissible speed data related to said maximum permissible speed corresponding to said stitch instruction group to which said extracted stitch instruction belongs; and
limiting the actual speed of said drive motor to said maximum permissible speed or less responsively to said permissible speed data.

* * * * *